US012567005B2

(12) United States Patent
Xu et al.

(10) Patent No.: US 12,567,005 B2
(45) Date of Patent: Mar. 3, 2026

(54) DETECTING ANOMALOUS DATA

(71) Applicant: International Business Machines Corporation, Armonk, NY (US)

(72) Inventors: Jing Xu, Xi'an (CN); Xue Ying Zhang, Xi'an (CN); Si Er Han, Xi'an (CN); Jing James Xu, Xi'an (CN); Xiao Ming Ma, Xi'an (CN); Wen Pei Yu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 17/884,923

(22) Filed: Aug. 10, 2022

(65) Prior Publication Data

US 2024/0054211 A1 Feb. 15, 2024

(51) Int. Cl.
| | |
|---|---|
| *G06N 20/20* | (2019.01) |
| *G06F 21/55* | (2013.01) |
| *G06N 3/088* | (2023.01) |
| *G06N 20/00* | (2019.01) |
| *G06N 20/10* | (2019.01) |

(52) U.S. Cl.
CPC .............. *G06N 20/20* (2019.01); *G06N 20/00* (2019.01); *G06N 20/10* (2019.01); *G06F 21/552* (2013.01); *G06F 2221/034* (2013.01); *G06N 3/088* (2013.01)

(58) Field of Classification Search
CPC ........ G06N 20/00; G06N 20/10; G06N 20/20; G06N 3/08; G06N 3/088; G06F 21/552; G06F 2221/034
See application file for complete search history.

(56) References Cited

U.S. PATENT DOCUMENTS

| | | | |
|---|---|---|---|
| 2018/0096261 A1 | 4/2018 | Chu | |
| 2019/0333522 A1* | 10/2019 | Lesso | G10L 17/06 |
| 2019/0362245 A1* | 11/2019 | Buda | G06F 17/18 |
| 2020/0005096 A1* | 1/2020 | Calmon | G06N 20/10 |
| 2021/0281592 A1 | 9/2021 | Givental | |
| 2022/0171995 A1* | 6/2022 | Balasubramanian .. | G06N 20/00 |
| 2024/0062120 A1* | 2/2024 | He | G06N 20/20 |

FOREIGN PATENT DOCUMENTS

| | | |
|---|---|---|
| CN | 111507376 A | 8/2020 |

OTHER PUBLICATIONS

Bii et al., "OAAE: Optimized adaptive anomaly detection ensemble-Base model boosting by parameter optimization", Research Article, Accepted: Jul. 27, 2021, Engineering Reports. 2022;4:e12449, 19 pps., <https://publons.com/publon/49146156/>.

(Continued)

*Primary Examiner* — Shane D Woolwine

(74) *Attorney, Agent, or Firm* — David K. Mattheis

(57) ABSTRACT

Detecting anomalous data by applying a plurality of models to a data set to yield detection results including anomalous data, applying evaluation methods to the detection results for each of the plurality of models, determining a combined score for the detection results according to the evaluation methods, determining a combined score threshold, and defining a set of detected anomalies according to the combined score and the combined score threshold.

14 Claims, 4 Drawing Sheets

200

(56) References Cited

OTHER PUBLICATIONS

Goix et al., "On Anomaly Ranking and Excess-Mass Curves", Appearing in Proceedings of the 18th International Conference on Artificial Intelligence and Statistics (AISTATS), 2015, 13 pps.

Mell et al., "The NIST Definition of Cloud Computing", National Institute of Standards and Technology, U.S. Department of Commerce, NIST Special Publication 800-145, Sep. 2011, 7 pages.

Pasillas-D'iaz et al., "An Unsupervised Approach for Combining Scores of Outlier Detection Techniques, Based on Similarity Measures", Electronic Notes in Theoretical Computer Science 329 (2016) 61-77, <https://www.sciencedirect.com/science/article/pii/S1571066116301128>.

Zhao et al., "Ensemble Algorithms for Unsupervised Anomaly Detection", Springer International Publishing Switzerland, 2015, (Eds.): IEA/AIE 2015, LNAI 9101, pp. 514-525.

* cited by examiner

200

DETECTING ANOMALOUS DATA

FIELD OF THE INVENTION

The disclosure relates generally to the detection of anomalous, and potentially fraudulent, data (data anomalies, or anomalies). The invention relates particularly to the automatic detection of anomalous data using unsupervised methods.

BACKGROUND

Finding possibly fraudulent or anomalous data, without known examples, represents a common problem in financial, security, and other applications. Unsupervised models may be used for this including clustering, principal components analysis, one-class SVM (support vector machines) and autoencoders. Usually, methods build one such unsupervised models on a training data set, and each data record will be assigned a score value by the model to measure the probability that the data record would be an anomaly. Then a data point will be considered as an anomaly if its score exceeds a defined threshold. An ensemble method using multiple such models may be used to improve the accuracy of the anomaly detection

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the detection of anomalous data.

Aspects of the invention disclose methods, systems and computer readable media associated with detecting anomalous data by applying a plurality of models to a data set to yield detection results including anomalous data, applying evaluation methods to the detection results for each of the plurality of models, determining a combined score for the detection results according to the evaluation methods, determining a combined score threshold, and defining a set of detected anomalies according to the combined score and the combined score threshold.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
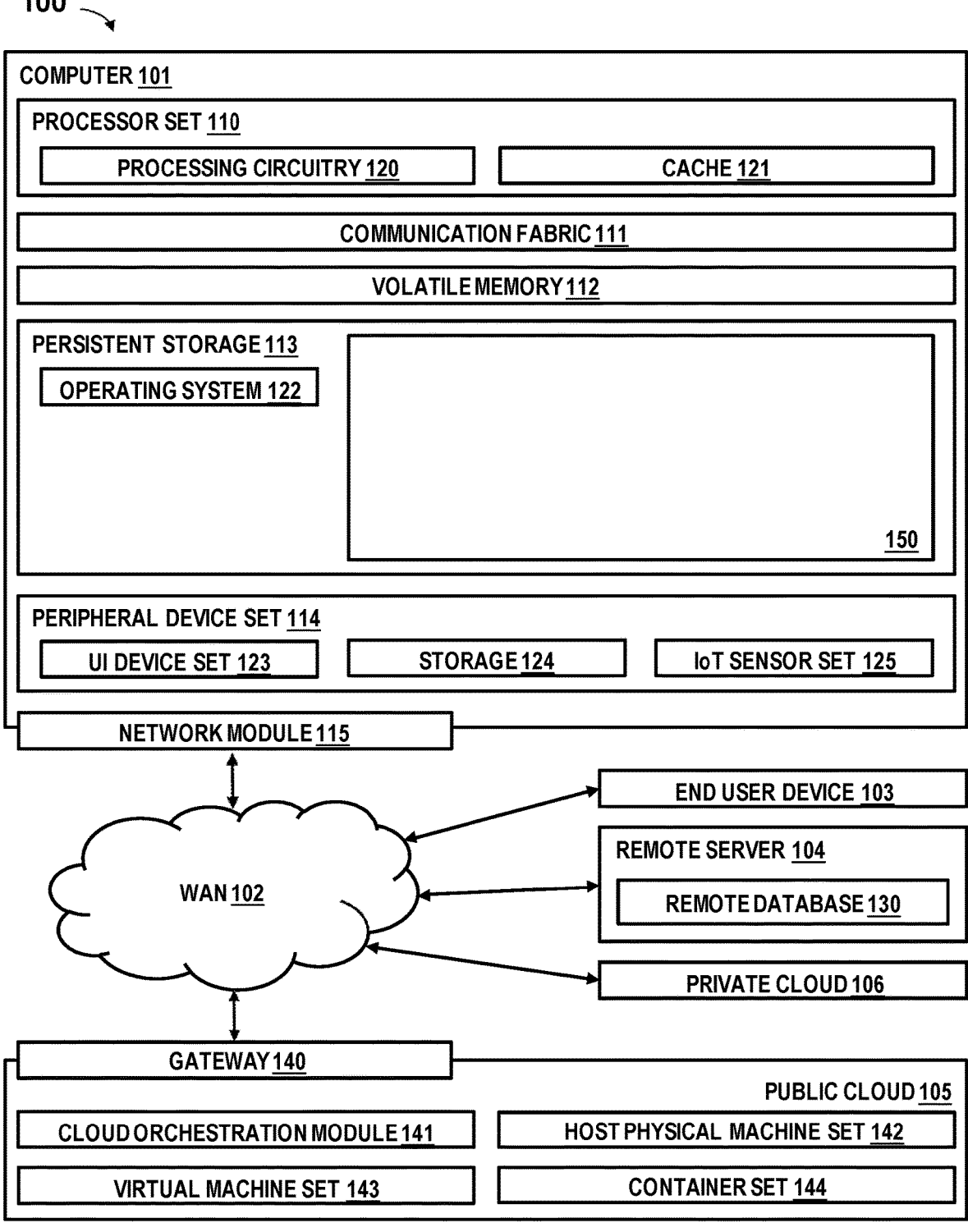
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Machine learning applications, including financial analysis, system and network security, and other such applications, focus attention and analyze anomalous data points as inputs. Such applications may be applied across large datasets and may need to begin by identifying anomalous data within those datasets. Even applications utilizing an ensemble of anomaly detection methods may miss some real anomalies as the ensemble methods oversimplify the task of identifying the anomalies. Without properly identified anomalies, the overall application may underperform or fail completely at the designated task such as identifying fraudulent financial transactions or identifying network or system security issues. Disclosed embodiments enable more robust methods for identifying anomalies from the input data sets, enabling more efficient use of application resources in analyzing the identified anomalies.

Aspects of the present invention relate generally to machine learning systems associated with analyzing anomalous data from an input data set. Disclosed embodiments apply a plurality of different detection models to the input data set, yielding a plurality of respective detection results, including anomalous data, from the input data set. Methods apply model-free evaluations to the plurality of model results and generate a combined score for the set of detection results according to the set of evaluations. Methods define a combined score threshold and identify anomalies according to the current combined scores and the combined score threshold. The identified anomalies serve as input to the machine learning application such as fraud or security breach detection applications.

In accordance with aspects of the invention methods automatically review input data, evaluate the review, define a threshold, and identify anomalies according to the threshold. Methods include applying multiple anomaly detection models to input data, yielding multiple detection results. Methods evaluate the results using non-model, or more direct evaluation methods such as an Excess-Mass curve, to the results. Methods determine a combined score for the current plurality of model results and compare the combined score to a combined score threshold. The methods determine the combined score threshold according to a method such as linear search. Methods identify anomalies according to the combined score and the determined combined score threshold. Disclosed methods improve the robustness of applications relying upon identified anomalies by increasing the likelihood of identifying all potential anomalies in input data.

Aspects of the invention also provide an improvement to computer functionality. In particular, implementations of the invention include a specific improvement to the way ML systems operate, embodied in the continually adjusted combined score threshold. In embodiments, the system adjusts the combined score threshold for each set of detection model results, such that the combined score threshold applied by methods to the current results potentially differs from the combined score threshold applied to the previous or subsequent results. As a result of adjusting the combined score threshold for the results set according to the results set, the system increases the likelihood that the system will accurately detect input anomalies. In this manner, embodiments of the invention affect how the ML system functions (i.e., the likelihood of detecting anomalous data associated with fraud or a security issue.

As an overview, an ML system constitutes an artificial intelligence application executed on data processing hardware that identifies potentially fraudulent transactions or at-risk system behaviors. The ML system receives inputs from various sources including input over a network, a corpus of electronic documents or other data, data from a content creator, information from one or more content users, and other such inputs from other possible sources of input. Data storage devices store the corpus of data. For example, an ML system accesses a body of knowledge about the domain, or subject matter area (e.g., financial domain, medical domain, legal domain, etc.) where the body of knowledge (knowledgebase) can be organized in a variety of configurations, such as but not limited to a structured repository of domain-specific information, such as ontologies, or unstructured data related to the domain, or a collection of natural language documents about the domain. Using unsupervised learning models, the ML system seeks to detect anomalous input data as an indicator of a fraudulent transaction, or a potential system or network security breach. Legitimate transactions and legitimate system and network activities tend to have common attributes while fraudulent transactions and security breaches tend to have non-standard (anomalous) attribute values, enabling their detection. For complex systems the differences between legitimate and illegitimate activities may be nuanced and may require higher sophistication in the detection methods to identify the anomalous activity of interest.

In an embodiment, one or more components of the system can employ hardware and/or software to solve problems that are highly technical in nature (e.g., applying a plurality of models to a data set to yield detection results including anomalous data, applying evaluation methods to the detection results for each of the plurality of models, determining a combined score for the detection results according to the evaluation methods, determining a combined score threshold, defining a set of detected anomalies according to the combined scores and the combined score threshold, etc.). These solutions are not abstract and cannot be performed as a set of mental acts by a human due to the processing capabilities needed to facilitate ML based anomaly detection and analysis, for example. Further, some of the processes performed may be performed by a specialized computer for carrying out defined tasks related to anomaly detection. For example, a specialized computer can be employed to carry out tasks related to ML systems including anomaly detection methods, or the like.

In an embodiment, an ML application includes an anomaly detection method. Methods receive input data associated with the application, such as system or network traffic data, or financial transaction data. Methods apply a plurality of different models including anomaly detections models to the data. Application of the plurality of models yield a plurality of results, including results detecting anomalous data in the input data. In an embodiment, methods apply unsupervised models including k-means, two-step clusters, and one-class SVM models to the input dataset to detect anomalies in the dataset. In this embodiment, for each record of the dataset, methods receive an indication of anomaly from each model used for detection, yielding multiple anomaly indications for each data record of the dataset. In an embodiment, each model yields a binary anomaly indication for each record, a 1 for anomalous records and a 0 for non-anomalous, or normal records.

In an embodiment, methods then apply model-free evaluation methods, such as an Excess-Mass curve evaluation, where the evaluation does not rely upon a model-based probability distribution, to the results of each anomaly detection model, yielding a set of evaluation scores measuring the performance of each model for each record of the analyzed dataset. In this embodiment, methods yield sets of anomaly detection indicators from each model and sets of model evaluations scores for each model, for each record of the dataset. As an example, for dataset record identified as "1", methods yield a set of anomaly indications, Ind1, Ind2, . . . Indn, and associated evaluation scores M1, M2 . . . Mn. In an embodiment, the evaluation score varies directly according to the evaluated performance of the detection method such that more accurate detection methods receive higher evaluation scores.

In an embodiment, for each record of the input dataset, methods determine a combined score according to the sum of the anomaly indicators weighted by the method evaluation score. For the example, the combined score for record 1 includes the sum $Ind1*M1+Ind2*M2+ . . . Indn*Mn$. In this embodiment, anomaly indicators from detection methods rated as more accurate are more highly weighted and the combined score reflects a greater contribution from the anomaly indicators derived from those models, with a lesser contribution in the combined scores from anomaly indications derived from less accurate models.

In an embodiment, in a training phase, methods determine a combined score threshold. In this embodiment, methods utilize a machine learning method, such as line search, to determine the combined score threshold value for the data. As an example of using line search, for a small dataset including truth vales, or accurately labeled data, and including M data records, methods sort all values in the set from largest to smallest score values. Beginning with i=1, and proceeding to i=M, methods set the i-th score value as the threshold, for each record in the set, score values less than the threshold receive a score of "0", and score values equal to or exceeding the threshold receive a score of "1". Methods compare the scores for the records with the truth for the records and determine an accuracy for each threshold as the number of accurate scores/M. In this embodiment, methods select the combined score threshold having the highest accuracy as the threshold for the current dataset. In this embodiment, methods then designate all records in the evaluated input dataset having a combined score at or above the threshold as anomalies and provide the identified anomalies as an input dataset for use by the downstream financial fraud detection, system security breach detection, network breach detection, or other application utilizing anomalous data as an input.

As shown in FIG. 1, computing environment 100 contains an example of an environment for the execution of at least some of the computer code involved in performing the inventive methods, such as ML applications including anomaly detection methods programming in block 150, retained in persistent storage 113. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 includes the signal conduction paths that allow the various components of computer 101 to communicate with each other. Typically, this fabric includes switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
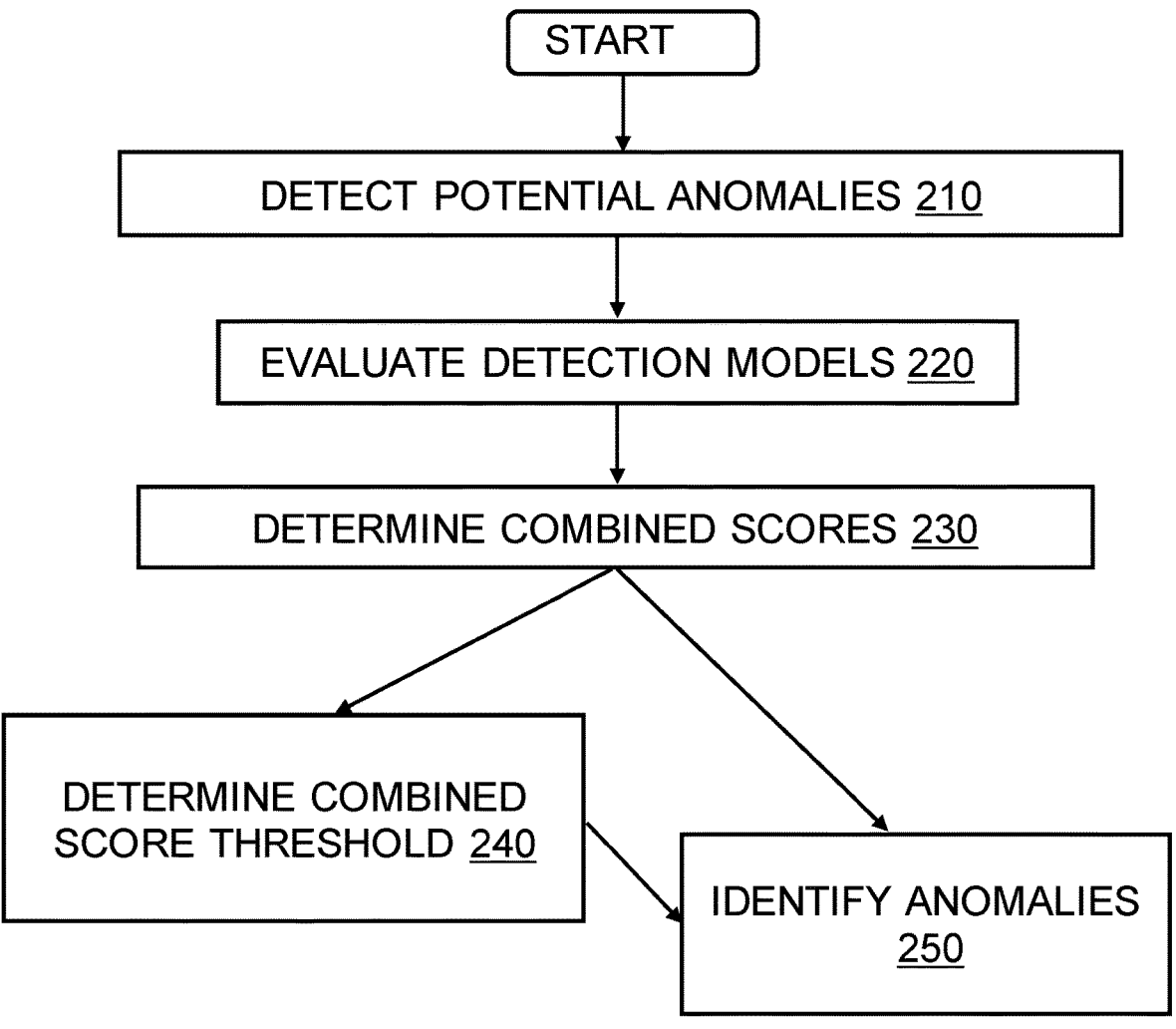
FIG. 2 provides a flowchart depicting an operational sequence, according to an embodiment of the invention.

FIG. 2 provides a flowchart 200, illustrating exemplary activities associated with the practice of the disclosure. After program start at block 210, methods receive input data and apply a plurality of anomaly detection models, such as k-means, two-step clusters, and one class support vector machines models to detect anomalies within the input dataset. In an embodiment, method derive a binary anomaly indication from each model for each record of the dataset.

At block 220, methods evaluate the performance of each anomaly detection method for each record using a model-free evaluation method such as an excess-mass curve to measure the performance of each model for each record. This evaluation yields a set of evaluation scores, one score for each binary anomaly indicator for each record of the dataset.

At block 230, methods determine a combined anomaly score for each record according to the binary anomaly indicators and the model evaluation scores for each model for each record. In an embodiment, methods weight the binary anomaly indication from each model by the model evaluation score for the individual records and models. Methods sum the set of (binary anomaly indication*model evaluation score) products into a single combination score for each record.

At block 240, methods determine a combined score threshold using a small training dataset having labeled records which include the truth regarding the anomaly status of the record. In an embodiment, methods may use a method such as line search to determine the combined score threshold which yields the highest level of accuracy for the identification of anomalies within the small dataset including the truth. In an embodiment, as methods receive new input data, some input data includes the truth by way of user input or other means. Methods augment the small training dataset used to determine the combined score threshold with the new records including the truth. These additions to the small dataset may yield a revised combined score threshold which methods then apply going forward to all evaluated records in identifying anomalous records.

At block 250, methods apply the determined combined score threshold to the input dataset including the combined scores from the set of detection methods binary anomaly indicators, and the set of model evaluation scores. In an embodiment, methods identify all records having a combined score matching or exceeding the determined combined score threshold as anomalies and pass the identified anomalies along as input to a parent application such as a fraud detection, or security analysis application.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
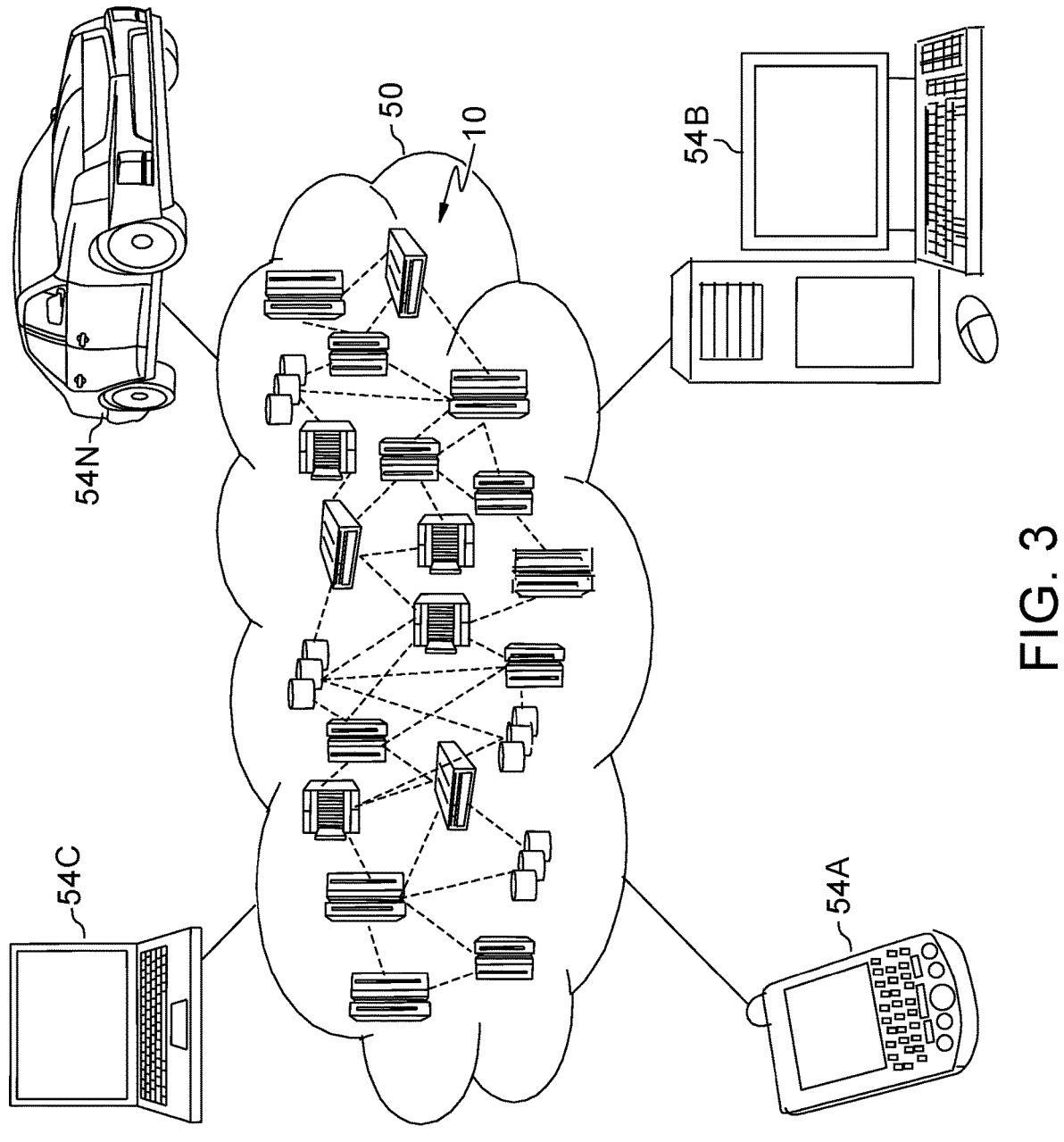
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
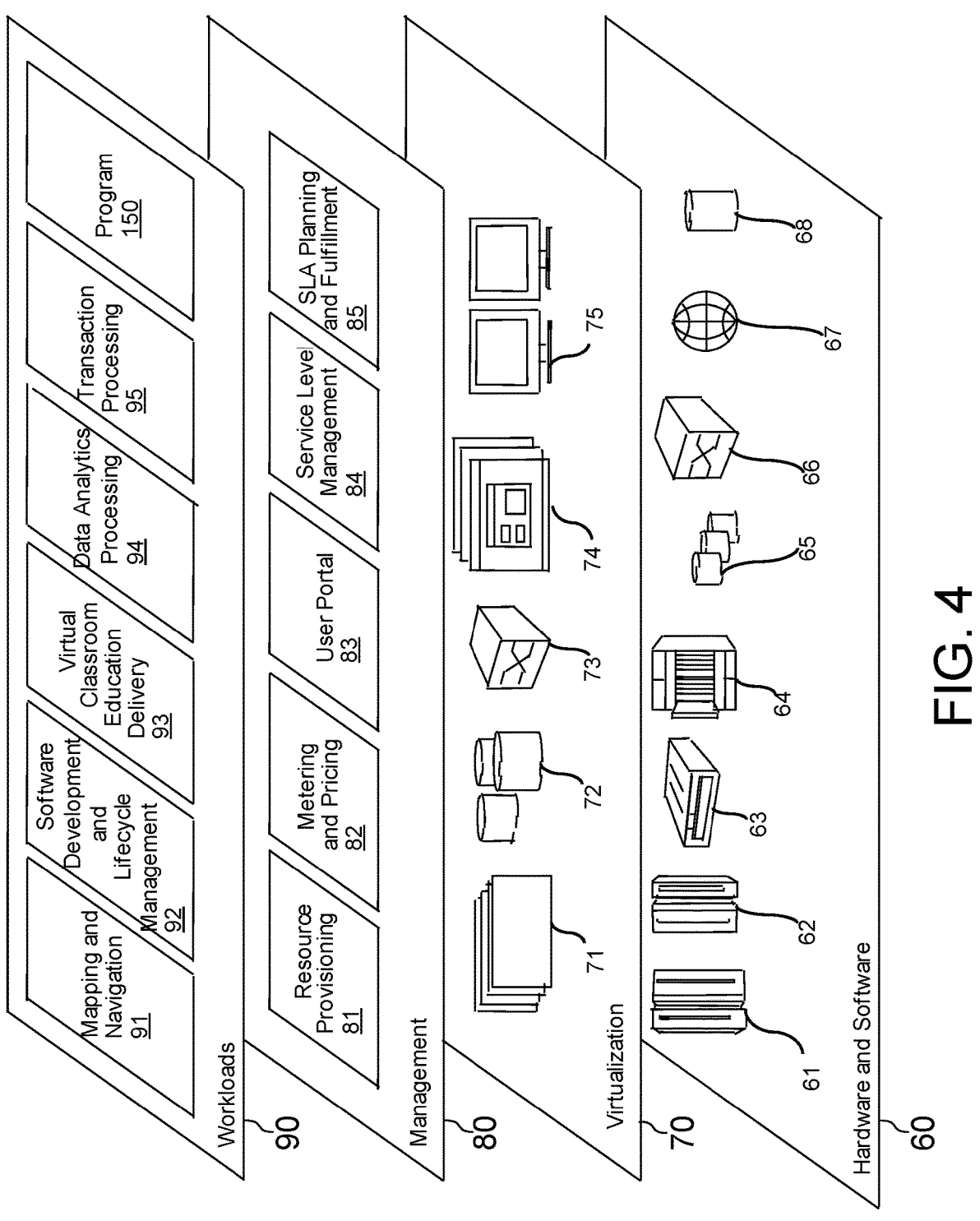
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection program 150.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:
   applying, by one or more computer processors, a plurality of models to a data set to yield detection results including anomalous data;
   applying, by the one or more computer processors, excess-mass curve evaluation to the detection results for each of the plurality of models;
   determining, by the one or more computer processors, a combined score for the detection results according to the detection results and the evaluation for each of the plurality of models;
   determining, by the one or more computer processors, a revised combined score threshold by:
      determining a combined score threshold for a training dataset of labeled data,
      receiving labeled input data, and
      determining the revised combined score threshold for a combination of the training dataset of labeled data and the labeled input data;
   defining, by the one or more computer processors, a set of detected anomalies according to the combined score and the revised combined score threshold; and
   providing, by the one or more computer processors, the set of detected anomalies as an input dataset for a downstream application.

2. The computer implemented method according to claim 1, wherein the detection results include a binary indication for a detected anomaly.

3. The computer implemented method according to claim 1, wherein the combined score comprises a weighted sum.

4. The computer implemented method according to claim 1, wherein the plurality of models comprises a model selected from a group consisting of k-means, two-step clusters, and one class support vector machines.

5. The computer implemented method according to claim 1, wherein the combined score comprises a sum of products of a model indication result and an associated evaluation method result.

6. A computer program product comprising one or more computer readable storage media and collectively stored program instructions on the one or more computer readable storage media, the stored program instructions comprising:

program instructions to apply a plurality of models to a data set to yield detection results including anomalous data;

program instructions to apply excess-mass evaluation to the detection results for each of the plurality of models;

program instructions to determine a combined score for the detection results according to the detection results and the evaluation for each of the plurality of models;

program instructions to determine a revised combined score threshold by:

determining a combined score threshold for a training dataset of labeled data, receiving labeled input data, and determining the revised combined score threshold for a combination of the training dataset of labeled data and the labeled input data;

program instructions to define a set of detected anomalies according to the combined score and the revised combined score threshold and program instructions to provide the set of detected anomalies as an input dataset for a downstream application.

7. The computer program product according to claim 6, wherein the detection results include a binary indication for a detected anomaly.

8. The computer program product according to claim 6, wherein the combined score comprises a weighted sum.

9. The computer program product according to claim 6, wherein the plurality of models comprises a model selected from a group consisting of k-means, two-step clusters, and one class support vector machines.

10. The computer program product according to claim 6, wherein the combined score comprises a sum of products of a model indication result and an associated evaluation method result.

11. A computer system comprising:

one or more computer processors;

one or more computer readable storage devices; and stored program instructions on the one or more computer readable storage devices for execution by the one or more computer processors, the stored program instructions comprising:

program instructions to apply a plurality of models to a data set to yield detection results including anomalous data;

program instructions to apply excess-mass evaluation to the detection results for each of the plurality of models;

program instructions to determine a combined score for the detection results according to the detection results and the evaluation for each of the plurality of models;

program instructions to determine a revised combined score threshold by:

determining a combined score threshold for a training dataset of labeled data, receiving labeled input data, and determining the revised combined score for a combination of the training dataset of labeled data and the labeled input data;

program instructions to define a set of detected anomalies according to the combined score and the revised combined score threshold and program instructions to provide the set of detected anomalies as an input dataset for a downstream application.

12. The computer system according to claim 11, wherein the detection results include a binary indication for a detected anomaly.

13. The computer system according to claim 11, wherein the combined score comprises a weighted sum.

14. The computer system according to claim 11, wherein the plurality of models comprises a model selected from a group consisting of k-means, two-step clusters, and one class support vector machines.

* * * * *